United States Patent Office 3,326,915
Patented June 20, 1967

3,326,915
SELF-POLYMERIZABLE BENZOPYRAZINE MONOMERS AND PROCESS FOR THE PREPARATION THEREOF
William G. Jackson and William Schroeder, North Muskegon, Mich., assignors to Burdick & Jackson Laboratories, Inc., Muskegon, Mich., a corporation of Michigan
No Drawing. Filed May 6, 1965, Ser. No. 453,815
9 Claims. (Cl. 260—250)

This invention relates to certain novel benzopyrazine (quinoxaline) type monomers which are useful for polymerization into novel high temperature polymers (resins). In particular the present invention relates to monomers of the strutcural formulas:

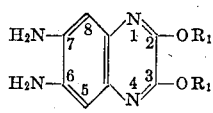

I(a)

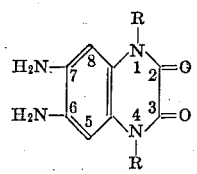

I(b)

and

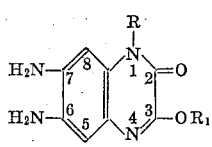

I(c)

and the polymers prepared therefrom wherein R is selected from the group consisting of hydrogen and lower alkyl groups and wherein $R_1O$ is a leaving group and acid amine salts of these monomers.

High temperature polymers are those which will stand temperatures up to about 900° F. for at least short periods of time and will retain their useful properties at lower temperatures over extended periods of time. Numerous high temperature polymers within this definition have been prepared by the prior art.

Polymers which are largely aromatic in character, with individual aromatic units joined together by covalent bonds, have been found to be very useful as high temperature polymers. Within this group of polymers there are a large number of different kinds of polymers. Important commercial polymers of this group are the aromatic polyimides and the polyamides.

Two commercially available high temperature aromatic amide-imide polymers are believed to be prepared from trimellitic anhydride and aromatic diamines. They are soluble in a variety of aprotic solvents such as dimethylacetamide, dimethylsulfoxide and N-methylpyrrolidone and are usually applied from solvent solution for coating purposes and then cured by heating. Good high temperature resistance, electrical, chemical and mechanical properties are exhibited by these polymers.

Other high temperature aromatic polymers are disclosed in a publication by Freeman, J. H. et al., SPE Transactions, 2 (No. 3), 1 (1962). They disclose a mixed aromatic polyamide-polyimide polymer obtained by first preparing an amine terminated polyamide from either m- or p-phenylene diamine and terephthalic or isophthalic acid and then reacting this aromatic polyamide with pyromellitic acid. These polymers maintain good strength for a considerable length of time at 572° F.

Another group of aromatic polymers are the polybenzimidazoles. These condensation polymers are prepared by reacting an aromatic tetramine with a diphenyl ester of a dibasic aromatic acid. Large numbers of aromatic polymers of this group have been made. They are stable in nitrogen up to temperatures of about 1,100° F.

There are a large number of high temperature aromatic polymers which have been prepared by various condensation reactions such as those illustrated above. However, a common problem in the preparation of these polymers is that high molecular weight polymers are difficult to obtain because of the criticality of the stoichiometry of the condensation reactions between compounds different chemical structures and the necessity for extremely pure reactant materials. Further, the high temperature characteristics of these resins, particularly in air, have not always been satisfactory.

An important group of high temperature aromatic polymers are known as the "ladder" polymers. The ladder polymers contain fused aromatic rings forming linear polymers. The term "ladder" as used in connection with these polymers reflects the appearance of the structural formula of the polymers which looks like a stepladder. A number of structures of this type have been proposed and in certain instances synthesized by various condensation reactions between compounds having different chemical structures. However, only relatively low molecular weights have been reported. When the polymer chain is short the resulting polymers do not have particularly useful fiber or film forming properties.

It is therefore an object of the present invention to provide novel benzopyrazine (quinoxaline) monomers which are self polymerizable into novel high molecular weight polymers having excellent high temperature properties.

It is further an object of the present invention to provide novel processes for the preparation of such self polymerizable monomers and polymers.

These and other objects will become increasingly apparent to those skilled in the art by reference to the following description.

The present invention relates to self polymerizable monomers selected from the group consisting of:

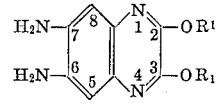

I(a)

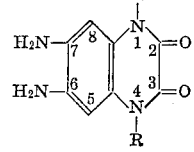

I(b)

and

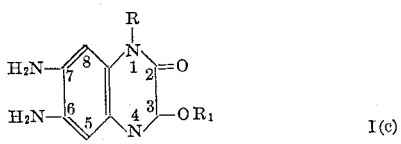

wherein R is selected from the group consisting of hydrogen and lower alkyl groups, containing 1 to 8 carbon atoms which can be substituted or unsubstituted, and wherein $R_1O$ is a leaving group, and acid amine salts of the monomers.

The compounds represented by the structural Formulas I(a), I(b) and I(c) can be broadly characterized as benzopyrazine or quinoxaline type compounds. The preferred members of the group I(a), I(b) and I(c) are: 6,7-diamino-2,3-dihydroxyquinoxaline and $N^1$ and $N^4$ position tautomers and acid amine salts thereof; 6,7-diamino-1,4-dimethyl-2,3-dioxy-1,2,3,4 - tetrahydroquinoxaline and acid amine salts thereof; and 6,7-diamino-2,3-diphenoxyquinoxaline and acid amine salts thereof. Other self polymerizable compounds which are useful and have structures represented by Formulas I(a), I(b) and I(c) are those wherein R is as above set forth and wherein $R_1$ is selected from the group consisting of hydrogen, lower alkyl groups containing 1 to 8 carbon atoms, carbocyclic groups containing six carbon atoms, and carbocyclic alkyl groups. When both of the R or $R_1$ groups are hydrogen, the three structures I(a), I(b) and I(c) are tautomeric forms of the same compound which exist in equilibrium. When the R or $R_1$ group is other than hydrogen, the three forms I(a), I(b) and I(c) represent distinct and different compounds. Within the group of compounds represented by the Formulas I(a), I(b) and I(c) are for instance:

6,7-diamino-1-methyl-2-oxy-3-hydroxy-1,2-dihydroquinoxaline;
6,7-diamino-1-methyl-2-oxy-3-phenoxy-1,2-dihydroquinoxaline;
6,7-diamino-2,3-dioxy-1,4-dioctyl-1,2,3,4-tetrahydroquinoxaline;
6,7-diamino-2,3-dioxy-1,4-diphenyl-1,2,3,4-tetrahydroquinoxaline;
6,7-diamino-2,3-dioxy-1,4-dibenzyl-1,2,3,4-tetrahydroquinoxaline;
6,7-diamino-2,3-dibenzyloxyquinoxaline;

and the like. There are many other self polymerizable compounds within the broad grouping defined by the Formulas I(a), I(b) and I(c) but it is believed that the above specified compounds are illustrative.

Regardless of the substitution on the oxygen in the 2 or 3 positions in the pyrazine portion of the benzopyrazine (quinoxaline) structure the compound is self polymerizable providing $R_1O$ is a leaving group. If the benzopyrazine monomers are substituted in the $N^1$ and/or $N^4$ positions with a lower alkyl group, it does not directly affect the capacity of the monomers to polymerize, however, the rate of polymerization can be affected by the choice of a particular R group. The $R_1$ groups on the oxygens in the 2 and/or 3 positions of the quinoxaline structure are displaced along with the oxygen during polymerization as will be discussed more fully hereinafter. Thus, in the 2 and/or 3 positions it is preferable that $R_1O$— be a good "leaving" group (that is, a group that will be easily removed from these positions) and as a result, the 2,3-diphenoxy compounds (where $R_1$ is phenyl) are preferred because of the ease of removal of the phenoxy groups during polymerization.

In the preparation of the compounds of the present invention, the basic reactions involve the nitration of a benzopyrazine (quinoxaline) compound in the 6 and 7 positions and the subsequent reduction of the nitro groups, by the use of a reducing agent, to the corresponding amino groups. The nitration proceeds selectively in the 6 and 7 positions of the benzopyrazine (quinoxaline) structure and the yields are essentially theoretical. The reduction to the diamino compound is accomplished by methods known to the prior art using conventional reducing agents.

The preparation of nitrated quinoxalines such as 6,7-dinitro - 2,3 - dihydroxyquinoxaline and 6,7-dinitro-1,4-dimethyl-2,3-dioxy-1,2,3,4 - tetrahydroquinoxaline is described in a publication by Cheeseman, G.W. Journal of the Chemical Society, 1962 page 1170. Reference also appears in Chemical Abstracts 57:816–818 (1962). The substitution of quinoxaline type compounds is extensively discussed in this publication.

The preparation of the polymers of the present invention from the self-polymerizable monomers will be discussed more fully hereinafter in the context of the examples. Illustrative of the preparation of the self polymerizable monomers of the present invention and the high temperature polymers therefrom are the following Examples I–VII:

EXAMPLE I

To a well stirred solution of 120 grams of stannous chloride dihydrate in admixture with 250 ml. of concentrated hydrochloric acid was added 20.16 grams (0.08 moles) of 6,7-dinitro-2,3-dihydroxyquinoxaline in small portions. The temperature of the solution, which was orginally at 15° C., rose rapidly as each portion was added and reacted. When 65° C. was reached, the temperature was held constant during the addition of the remainder of the 6,7-dinitro-2,3-dihydroxyquinoxaline.

After the addition was completed, the mixture was heated for one hour at 60° C. There was no visual change in the reaction mixture as a result of this additional heating. The mixture was cooled and the precipitate which formed was collected and washed with 15 ml. of concentrated hydrochloric acid. The precipitate was then dissolved in 800 ml. of boiling water. The solution was filtered to remove solid impurities and then 300 ml. of concentrated hydrochloric acid was added to the filtrate. The solution was then cooled and crystals of the product 6,7-diamino-2,3 - dihydroxyquinoxaline dihydrochloride precipitated rapidly. After cooling for about one-half the crystals were filtered from the solution and washed with dilute hydrochloric acid and then with 25 ml. of methanol. The crystals were partially dried on the filter and then dried in air under a heat lamp. The 6,7-diamino-2,3-dihydroxyquinoxaline as the dihydrochloride monohydrate product weighed 14.4 grams (0.055 moles) and the yield was 69%. The product did not melt below 300° C. The calculated analysis for 6,7-diamino-2,3-dihydroxyquinoxaline as the dihydrochloride monohydrate is as follows: C, 33.00; H, 4.1; N, 19.0; Cl, 24.5. The analyses which were found were C, 33.14, 33.41; H, 4.43, 4.42; N, 19.23, 19.51; Cl, 25.02, 24.87. The infrared maxima in cm.$^{-1}$ were as follows: 3370, 3100, 2670, 2580, 1960w, 1710s, 1645, 1620, 1595, 1560, 1535, 1500, 1390s, 1295, 1260, 1125, 1100, 1070w, 900, 870w, 815 730w and 690.

As can be seen in Example I, the product is in the form of the hydrochloride salt because of the use of hydrochloric acid as the reaction medium. Where acids are used as the reaction medium for the reducing agents, the acid amine salts are formed. Conversion of the acid amine salts to the free amine is easily made by reaction with a base by methods well known to the prior art.

Examples of other reducing agents which can be used in the manner of Example I are zinc and tin. Suitable reducing agent media are for instance tin in hydrochloric acid, zinc in acetic acid and zinc in aqueous alkali solutions such as aqueous sodium hydroxide.

It is preferred to conduct the reduction of the nitro groups in the process of the present invention, using reducing agents such as in Example I, at a temperature between about 0° to 100° C., although about 40° to 70° C. is especially preferred. It is also preferred to recrystalize the product in order to obtain the purity indicated in Example I. The product is dried in a conventional manner at elevated temperatures.

Illustrative of the polymerization of the 6,7-diamino-2,3-dihydroxyquinoxaline dihydrochloride monohydrate of Example I is the following Example II.

EXAMPLE II

A mixture of 5 grams of 6,7-diamino-2,3-dihydroxyquinoxaline dihydrochloride monohydrate, as prepared in Example I, and 100 grams of 105% phosphoric acid was placed in a 200 ml. Pyrex flask and slowly stirred and heated. At about 50° C., hydrogen chloride began to evolve as a gas and the solid dissolved. The temperature was slowly raised to 220° C. over 45 minutes during which time the original yellow-orange colored solution had changed to dark red. Stirring was stopped and the temperature kept between 210° C. and 230° C. for three hours. The deep red almost black solution was cooled to 50° C. and poured slowly into 1.5 liters of stirred water and stirring was continued. The heavy black precipitate which separated was collected on the filter, washed with water and methanol. In order to remove any remaining phosphoric acid, the precipitate was stirred in 1.5 liters of water for two additional days at room temperature. The resulting fine powder was then collected, washed with water and methanol and allowed to dry in the air under a heat lamp for 10 hours. The product was a shiny, black graphite-like powdered polymer and the yield was 3 grams.

The product had a graphite like character even after heating for several minutes to a red heat in the flame of a burner. More detailed analysis of the polymeric product showed a significant weight loss at about 150° C. which represented volatilization of water which was present from insufficient prior removal or further polymerization during the test. There was no further weight loss upon heating to 900° C. The polymer did not change during heating above 900° C. for short periods of time and withstood lower elevated temperatures for extended periods of time. The polymer had an intrinsic viscosity up to about 0.8. This corresponds to a molecular weight in the range of about 60,000–70,000.

The polymer formed is believed, because of its high temperature properties, to contain substantial portions of a ladder type structure. Thus the polymer obtained in Example II is believed to contain substantial amounts of a polymer illustrated by the structural formula:

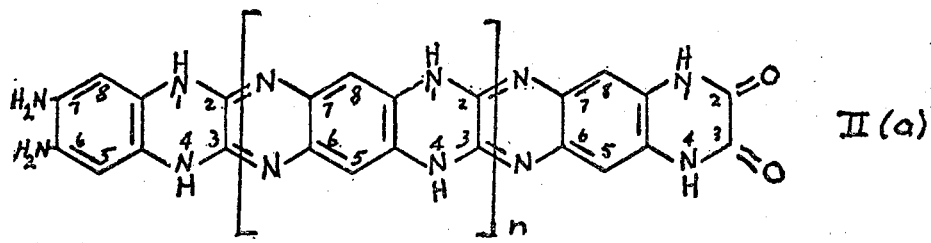

II(a)

and/or a tautomeric form; for example:

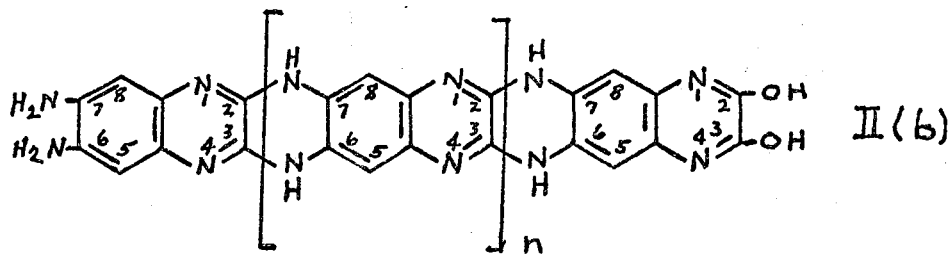

II(b)

and can undergo at least partial oxidation at elevated temperatures in air to a polymer illustrated by the structural formula unit from polymer II(a) or II(b):

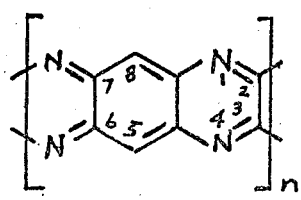

wherein $n$ represents a repeating unit and is a number between about 10 and 10,000. Certain amounts of polymer segments illustrated by the structural formula:

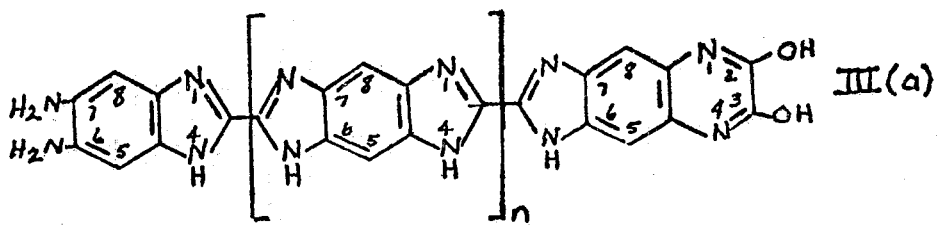

are also believed to have been present in the polymer wherein $n$ is as previously defined. In the polymer obtained in Example II, it was estimated that $n$ was about 500.

The exact distribution of polymer segments "$n$" in polymers II(a) and (b) and III(a) is unknown but is believed that the selection of reaction conditions and in certain instances the choice of known polymerization catalysts have some substantial bearing upon the relative amount of polymers II(a) and (b) and III(a).

It will be understood that the modes of polymerization shown in formulas II(a) and (b) and III(a) are indicated as occurring in separate polymer chains for descriptive purposes only. In actuality, it is to be expected that when both modes of polymerization occur, an individual polymer chain may possess both types of structures with transitional hybrid units of the structural formulas:

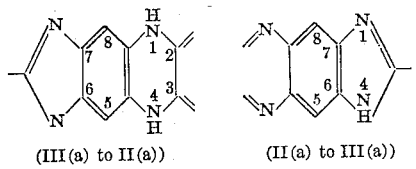

(III(a) to II(a))    (II(a) to III(a))

forming bridges between the $n$ units shown in polymers II(a) and (b) and III(a).

Polymers composed completely of hybrid units of the structural formula:

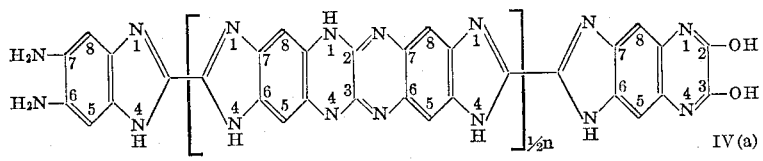

are also possible as a result of the polymerization. However, it is believed that the greater the amount of $n$ units of polymer II(a) and (b), the higher the temperature resistance of the product will be. It is also believed that the physical properties (chemical resistance, etc.) are better for structures of the ladder type of polymer II(a) and (b).

Examples I and II illustrate a preferred embodiment of the present invention. The monomer 6,7-diamino-2,3-dihydroxyquinoxaline is inexpensive and is readily polymerized into very excellent polymers as can be seen from the foregoing Example II; however, a disadvantage of the polymers of Example II is that they are difficultly soluble in aprotic solvents and have been found to date to be soluble only in protic solvents such as trifluoroacetic acid, sulfuric acid and methane sulfonic acid. For this reason, it is desirable to have substituents in the $N^1$ and/or $N^4$ positions of the 6,7-diaminoquinoxalines to improve the solubility of the polymers produced. Illustrative of these compounds and the polymers formed therefrom is the compound 6,7 - diamino-1,4-dimethyl-2,3-dioxy-1,2,3,4-tetrahydroquinoxaline described in the following Example III and the polymer described in Example IV.

EXAMPLE III

Using the procedure of Example I, six (6.0) grams of stannous chloride dihydrate were mixed with 12 ml. of concentrated hydrochloric acid. One (1.0) gram of 6,7-dinitro - 1,4-dimethyl-2,3-dioxy-1,2,3,4-tetrahydroquinoxaline was added in portions to the solution with stirring. The temperature of the solution was allowed to rise to 65° C. where it was maintained until the addition was complete. The solution was then cooled.

The crystalline product precipitated from the solution at room temperature and was collected and washed with concentrated hydrochloric acid. The fine precipitate of product 6,7-diamino-1,4-dimethyl-2,3-dioxy-1,2,3,4 - tetrahydroquinoxaline dihydrochloride was washed with a small amount of methanol and then recrystallized from methanol. The product was dried at room temperature in vacuo for four hours and then analyzed. The analysis calculated for the product as the dimethanolate is C, 40.34; H, 6.21; found C, 39.98; H, 5.98. Infrared maxima of the product in cm.$^{-1}$ were 3430, 2750$sh$, 2600, 1740$s$, 1640, 1610, 1560, 1525, 1485, 1390, 868$s$ and 747. The product did not melt below 300° C. The product was relatively more soluble in most solvents than the 6,7-diamino-2,3-dihydroxyquinoxaline product of Example I.

The intermediate 6,7-dinitro-1,4-dimethyl-2,3-dioxy-1,2,3,4-tetrahydroquinoxaline is prepared by the method of Cheeseman et al., heretofore discussed, by the reaction of 2,3-dihydroxyquinoxaline with dimethyl sulfate to form 1,4-dimethyl-2,3-dioxy-1,2,3,4-tetrahydroquinoxaline with the subsequent nitration of this quinoxaline in the 6 and 7 positions. Other lower alkyl groups can be substituted in the 1 and/or 4 position of quinoxaline by reaction of 2,3-dihydroxyquinoxaline with the corresponding symmetrical di-lower alkyl sulfate using the method disclosed in Cheeseman et al. or by using other alkylating agents. However, for reasons of economy, it is preferred to use dimethyl sulfate or diethyl sulfate since these compounds are readily available.

Illustrative of the polymerization of the product of Example III is Example IV.

EXAMPLE IV

Using the procedure of Example II, 6,7-diamino-1,4-dimethyl-2,3-dioxy-1,2,3,4-tetrahydroquinoxaline dihydrochloride, such as that produced in Example III, was polymerized. It was found that the polymerized product had excellent temperature resistance properties and was relatively more soluble than the polymer of Example II in conventional aprotic solvents for high temperature resins.

The structural formula for the polymer produced from the 6,7-diamino-1,4-dimethyl-2,3-dioxy-1,2,3,4-tetrahydroquinoxaline dihydrochloride is similar in structure to polymers illustrated by the Formulas II(a), III(a) and IV(a), except that R groups as lower alkyl groups, e.g. methyl, replace the hydrogens on some of the $N^1$ and/or $N_4$ nitrogens. The structural formulas corresponding to polymers II(a), III(a) and IV(a) are polymers II(c), III(b) and IV(b) which are illustrated as follows:

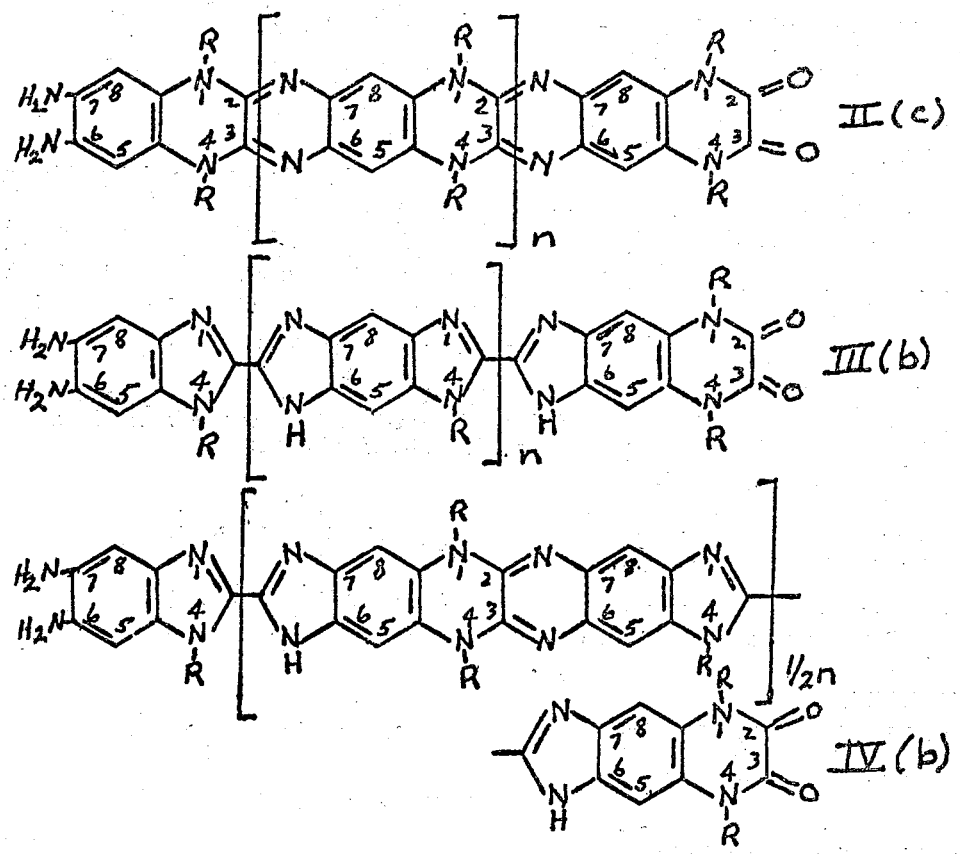

and transitional hybrids similar to those discussed above in connection with polymers II(a) and III(a), having the structural formulas:

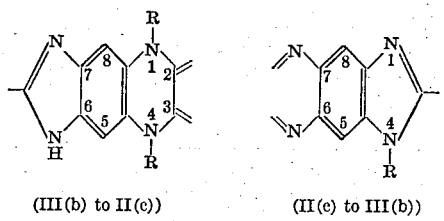

(III(b) to II(c))  (II(c) to III(b))

wherein $n$ represents a repeating unit and is a number between 10 and 10,000.

Illustrative of the self polymerizable monomers of the present invention wherein leaving groups other than hydroxyl groups are positioned in the 2 and 3 carbon positions of the quinoxaline structure and the polymers prepared therefrom is the compound 6,7-diamino-2,3-diphenoxyquinoxaline dihydrochloride illustrated in Example V and the polymer prepared therefrom in Example VI.

EXAMPLE V

The compound 6,7 - dinitro-2,3-diphenoxyquinoxaline was prepared as a novel intermediate. A mixture of 8.0 grams (0.2 moles) of sodium hydroxide and 25 ml. of phenol in 200 ml. of dioxane was refluxed until all of the sodium hydroxide had dissolved. The resulting solution was cooled to 15° C. and stirred well while 28.9 grams (0.1 moles) of 2,3-dichloro-6,7-dinitroquinoxaline was added in small portions. The temperature was kept below 20° C. by a cold water bath. The suspension was stirred for an additional 10 minutes and then poured into 800 ml. of cold water. The yellow-brown granular precipitate was collected and washed with water. After drying in air under a heat lamp, the crude product weighed 39 grams (96% yield). Recrystallization from acetone-water afforded light yellow crystals with a melting point of 214–215° C. Recrystallization can also be effected from ethyl acetate-petroleum ether. Infrared maxima in cm.$^{-1}$ 1555, 1525, 1495w, 1480, 1445, 1385, 1340, 1240, 1200, 1150w, 960, 850, 778, 754, 737, 729, 685.

A solution of 8.08 grams (0.02 mole) of 6,7-dinitro-2,3-diphenoxyquinoxaline in 100 ml. of ethyl acetate was hydrogenated in a Parr$_{TM}$ apparatus at 45 lbs. pressure in the presence of nickel catalyst. The catalyst was filtered off and the filtrate added to 200 ml. of 4 N hydrochloric acid. The precipitated hydrochloride was collected on a funnel and washed with water. The yield of light brown 6,7 - diamino - 2,3-diphenoxyquinoxaline dihydrochloride was 7.5 grams. Recrystallization from methanol-water afforded light tan crystals with a melting point of 204–205° C. Infrared maxima in cm.$^{-1}$: 330, 1625w, 1590, 1555w, 1510, 1480, 1425, 1350, 1265, 1200, 860, 760, 730, 687.

Example V illustrates the preparation of the novel intermediate 6,7-dinitro-2,3-diphenoxyquinoxaline. In general, the preparation involves the reaction of 2,3-dichloro-6,7-dinitroquinoxaline, which is disclosed in the Cheeseman article discussed above, with an alkali metal phenolate such as sodium phenolate. The reaction is conducted in a solvent at reduced temperatures preferably between about 10 to 15° C. The product is removed from the solvent and preferably recrystallized.

Example V also illustrates the reduction of the nitro groups in 6,7-dinitro-2,3-diphenoxyquinoxaline using hydrogen and a catalyst as the reducing agent in a solvent. After the reduction was complete, the catalyst was removed and the product 6,7-dinitro-2,3-diphenoxyquinoxaline was precipitated from the solvent as the dihydrochloride salt by adding hydrochloric acid. Other acids can be used; however, hydrochloric acid is preferred for reasons of economy. The product is removed from the solvent and preferably recrystallized.

Illustrative of the polymerization of the monomer of Example V is the following Example VI.

EXAMPLE VI

The product of Example V was converted to the free base 6,7-diamino-2,3-diphenoxyquinoxaline. Aqueous sodium hydroxide was added to a solution of 6,7-diamino-2,3-diphenoxyquinoxaline dihydrochloride. After dilution with water, the precipitated free base was collected and washed with water. After recrystallization from a dioxane-water solution, in the presence of a small quantity of sodium hydrosulfite, the product melted at 204–206° C. Infrared maxima in cm.$^{-1}$: 3650, 1630, 1585, 1550, 1480, 1420, 1340, 1265, 1195, 1120, 1080 w, 1020w, 950, 875, 857, 760, 728, 688.

The 6,7-diamino-2,3-diphenoxyquinoxaline contained in a polymer tube was gradually heated in vacuo to above its melting point (ca. 204°) and then heated and maintained in the temperature range 250–300° C. The fluid melt of 6,7-diamino-2,3-diphenoxyquinoxaline evolved phenol and gradually polymerized to a black, fairly brittle layer or film on the walls of the polymer tube. The polymer was essentially insoluble in all aprotic solvents, hot or cold. It was very heat stable even in air, and could be maintained at red heat for several minutes without losing shape or dimensions. The product was similar to the product of Example II and had excellent high temperature resistance properties.

Illustrative of another method for the polymerization of the 2,3-dihydroxy-6,7-diaminoquinoxaline of Example I is the following Example VII.

EXAMPLE VII

To 404 milligrams (ca. 1.52 millimoles) of 2,3-dihydroxy-6,7-diaminoquinoxaline dihydrochloride was added 5 ml. of ethylene glycol and the mixture was stirred and heated. The 2,3-dihydroxy-6,7-diaminoquinoxaline dihydrochloride dissolved in the ethylene glycol and then another material precipitated indicating at least the beginning of polymerization. The precipitate was a golden yellow flocculent material.

Then 222 milligrams (1.61 millimoles) of anhydrous potassium carbonate which served as a base was added. The mixture immediately foamed and the color changed to deep brown with the solid still in suspension. The heating was continued for a period of about two hours and the mixture gradually darkened.

After the heating was complete, 20 ml. of water was added to the mixture and the mixture was allowed to cool for about 12 hours. The polymer was then filtered from the mixture and washed with water and air dried. The polymer was also dried with heating. The polymeric product was similar to the product produced in Example II.

As can be seen from the foregoing Examples II, IV, VI and VII, the polymerization of the monomers of the present invention can be conducted by condensation reactions in a solvent as in Examples II, IV and VII or by fusion techniques as in Example VI. Polymerization in nitrogen or other inert atmosphere can be used to prevent oxidation of the polymer during polymerization. The polymerization of the compounds of the present invention can be accomplished by heating using techniques familiar to the prior art in the polymerization of monomers.

It will be appreciated that the R groups in the monomers of the present invention are in certain instances removed during polymerization. Thus, the polymerization intermediates can be illustrated as follows:

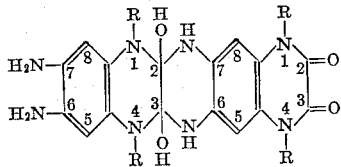

II(d)

and

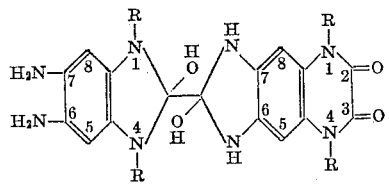

III(c)

wherein R is selected from the group consisting of lower alkyl groups and hydrogen and which intermediate is gradually building up to its ultimate length. As can be seen from the intermediates II(d) and III(c), lower alkanols (ROH) and/or water can be removed and with further polymerization the intermediate ultimately produces the polymers represented by the Formulas II(a), (b) or (c), or III(a) or (b) depending upon the conditions of polymerization.

In all instances, the R$_1$O— leaving groups are removed during polymerization. Thus polymerization intermediates can be illustrated as follows:

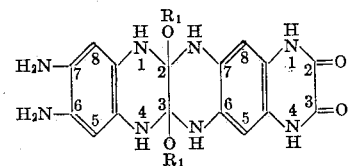

II(e)

and

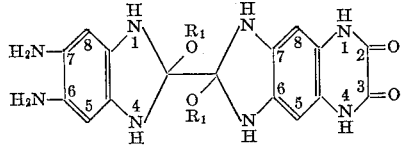

III(d)

wherein R$_1$O is a leaving group which intermediate is gradually building up to its ultimate length. The removal of the hydroxide (R$_1$OH) and further polymerization ultimately produces the structures II(a) or II(b) or III(a).

Using the procedures of Examples I, III and V, numerous other self polymerizable quinoxaline monomers can be prepared as above enumerated. In each instance the resulting compounds were self polymerizable in the manner of Examples II, IV, VI and VII. Where leaving groups other than hydroxyl were present in the 2 or 3 positions of the quinoxaline structure, the ease of polymerization was affected by the ability of the leaving group to be removed. The insertion of the various leaving groups in the 2 and/or 3 positions of the quinoxaline structure is accomplished by methods known to those skilled in the art.

The foregoing description is intended to be only illustrative of the present invention and it is intended that this invention be limited only by the scope of the hereinafter appended claims.

We claim:
1. The self polymerizable monomer selected from the group consisting of:

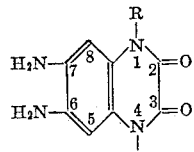

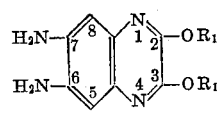

3,326,915 and

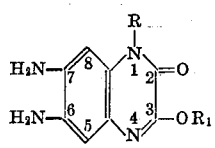

wherein R is selected from the group consisting of hydrogen and lower alkyl groups containing 1 to 8 carbon atoms and wherein $R_1O$ is a leaving group wherein $R_1$ is selected from the group consisting of hydrogen, lower alkyl containing 1 to 8 carbon atoms, phenyl and benzyl groups and 6,7-diamino acid amine salts of acids suitable as a reaction medium in the preparation of the monomers by the reduction of the corresponding 6,7-dinitro compounds.

2. The monomer:

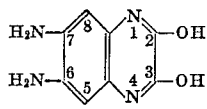

and $N^1$ and $N^4$ tautomers and 6,7-diamino acid amine salts suitable as a reaction medium in the preparation of the monomers by the reduction of the corresponding 6,7-dinitro compounds.

3. The monomer:

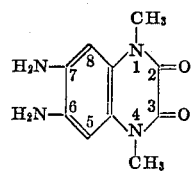

and 6,7-diamino acid amine salts of acids suitable as a reaction medium in the preparation of the monomers by the reduction of the corresponding 6,7-dinitro compounds.

4. The monomer:

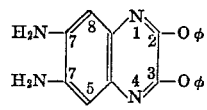

and 6,7-diamino acid amine salts of acids suitable as a reaction medium in the preparation of the monomers by the reaction of the corresponding 6,7-dinitro compounds wherein $\phi$ is an unsubstituted phenyl group.

5. The process of producing the self polymerizable monomers selected from the group consisting of:

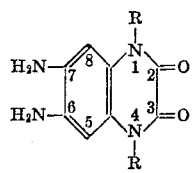

and

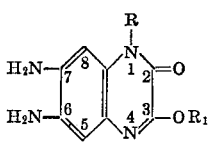

wherein R is selected from the group consisting of hydrogen and lower alkyl groups containing 1 to 8 carbon atoms and wherein $R_1O$ is a leaving group wherein $R_1$ is selected from the group consisting of hydrogen, lower alkyl containing 1 to 8 carbon atoms, phenyl and benzyl groups and 6,7-diamino acid amine salts of acids suitable as a reaction medium in the preparaiton of the monomers by the reduction of the corresponding 6,7-dinitro compounds of the monomers which comprises: reacting at a temperature between about 0° to 100° C. a compound selected from the group consisting of:

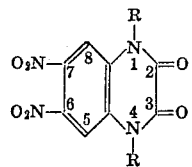

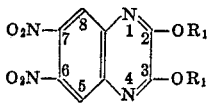

and

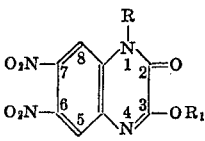

with a reducing agent selected from the group consisting of zinc, tin and stannous chloride in a suitable media for the reducing agent wherein R and $R_1O$ are as defined before.

6. The process of claim 5 wherein the monomer is:

and wherein the reactant compound is:

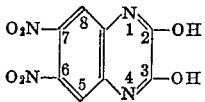

7. The process of claim 5 wherein the monomer is:

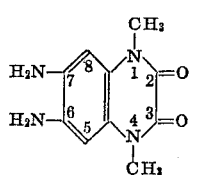

and wherein the reactant compound is:

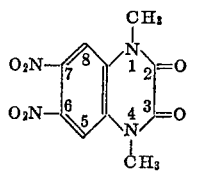

8. The process of claim 5 wherein the monomer is:
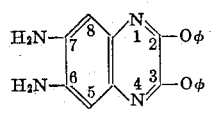
and wherein the reactant compound is:
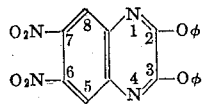
wherein φ is an unsubstituted phenyl group.
9. The compound:
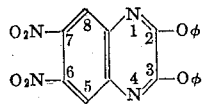
wherein φO— is a phenoxy leaving group.
References Cited
UNITED STATES PATENTS
3,040,046    6/1962    Sasse et al. _____ 260—250
NICHOLAS S. RIZZO, *Primary Examiner.*